United States Patent [19]
Casotto

[11] Patent Number: 5,634,056
[45] Date of Patent: May 27, 1997

[54] RUN TIME DEPENDENCY MANAGEMENT FACILITY FOR CONTROLLING CHANGE PROPAGATION UTILIZING RELATIONSHIP GRAPH

[75] Inventor: Andrea Casotto, Alameda, Calif.

[73] Assignee: Runtime Design Automation, Sunnyvale, Calif.

[21] Appl. No.: 540,392

[22] Filed: Oct. 6, 1995

[51] Int. Cl.⁶ .................................................. G06F 17/30
[52] U.S. Cl. ........................................... 395/619; 395/617
[58] Field of Search ........................ 395/600, 200.05, 395/700, 200.08, 650, 550, 617, 619; 364/300

[56] References Cited

U.S. PATENT DOCUMENTS

| | | | |
|---|---|---|---|
| 4,916,610 | 4/1990 | Bapat | 364/300 |
| 5,179,702 | 1/1993 | Spix et al. | 395/650 |
| 5,434,995 | 7/1995 | Oberlin et al. | 395/550 |
| 5,524,212 | 6/1996 | Somani et al. | 395/200.08 |
| 5,535,393 | 7/1996 | Reeve et al. | 395/700 |
| 5,546,576 | 8/1996 | Cochrane et al. | 395/600 |

OTHER PUBLICATIONS

Casotto, et al., Automated Design Management Using Traces, Aug. 1993, IEEE Transactions on Computer–Aided Design of Integrated Circuits and Systems, vol. 12, No. 8 (pp. 1077–1095).

*Primary Examiner*—Thomas G. Black
*Assistant Examiner*—Frantz Coby
*Attorney, Agent, or Firm*—Hickman Beyer & Weaver

[57] ABSTRACT

A method and apparatus for controlling the propagation of changes made to a data file in a system of interrelated data files is described. In one embodiment of the method of the invention, a run-time dependency management facility is provided on the computer system which is effective to generate under computer control a graph indicating relationships among the data files and software tools present on the system. A change is made to at least one of the data files and a determination is made as to whether that change is significant. If a significant change is made, then at least one propagation barrier is provided which is effective to prevent computer-implemented propagation of the change in said data file through at least one data file which is interdependent with the changed data file. In another embodiment, a computer readable medium containing program instructions for providing a run-time dependency management facility on a computer in which the run-time dependency facility is effective to generate under computer control a graph indicating relationships among the data files and the software tools residing on the system. The computer readable medium further includes program instructions for determining under computer control that the change to data in at least one of the data files is not a significant change. Finally the computer readable medium includes program instructions for generating at least one propagation barrier in response to the determination which is effective to prevent propagation of the changes in the data file through at least one data file which is interrelated with the changed data file. The above-described computer readable medium may also include program instructions for a clever tool which can determine whether changes made to the changed data file are significant.

19 Claims, 10 Drawing Sheets

Figure 2 — Prior Art

RUN TIME DEPENDENCY MANAGEMENT FACILITY FOR CONTROLLING CHANGE PROPAGATION UTILIZING RELATIONSHIP GRAPH

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. The Field of the Invention

The present invention relates to the management of files on computer systems. More specifically, the present invention provides a computer implemented method and apparatus for managing the propagation of information among multiple files which are interrelated by various software tools. Thus, the present invention will be of interest in the areas of computer-aided design and computer aided engineering.

2. The Relevant Art

Over the past two decades the use of Computer-Aided Design (CAD) and Computer-Aided Engineering (CAE) software has grown dramatically. These programs allow designers and engineers to create complex structures quickly and efficiently by providing sophisticated simulation, synthesis, validation, and drawing tools in addition to various facilities for organizing data associated with the structures created on the systems. With ever faster computing speeds and ever more capacious data storage devices, the number of applications to which CAD and CAE are being applied has exploded.

As the success of CAD and CAE has grown, so too has the number of files that are generated during projects comprising multiple work sessions. The files are interrelated by the various software tools that are provided by the system. Thus, some files will serve as inputs for certain tools which tools then create output files that are used as inputs for other tools to create a second generation of output files which are then used as inputs for still other tools and so on. For example, the design of complex systems, such as computer chips may require the generation of thousands of interrelated data files. Changes to a single file amongst the large library of files created by the design software requires the propagation of the changes through all of the files depending from the changed file in order to maintain design consistency.

Because the number of files in these situations can literally run on the order of thousands of files, and because the computation time required for processing the large number of files can be long relative to the project timetable, it is clear that propagating changes throughout the files of a project can be an expensive task in terms of computing costs and in terms of the allocation of human resources. This cost is compounded by the fact that in many cases large numbers of files related to a particular project need not be recompiled or reprocessed every time a change is made to one or a few files in the system. For example, changes made to comments within a file often do not require the processing of all of the files in the system; yet, most conventional systems would perform this expensive and unnecessary task.

Thus, it would be advantageous to have a system in which the processing, or propagation, of changes from a file through all of the files that are related to it is performed in an intelligent manner, meaning that the system can determine which changes require propagation and which changes do not. The development of an intelligent system of propagating changes in these systems of interrelated files would greatly improve efficiency in terms of utilization of computing power, as designers and engineers can process only those files which absolutely must be reprocessed in order to maintain confidence that the project is up-to-date and fully consistent.

SUMMARY OF THE INVENTION

The present invention provides a method and apparatus for limiting unnecessary propagation of changes made to one or more files in a system of interrelated files. Thus, the present invention will be seen to reduce expensive processor use and increase the productivity of computer hardware and human resources associated with projects involving large numbers of interrelated files.

In one aspect, the present invention provides a method for controlling the computer-implemented propagation of changes made to at least one data file throughout a system of interrelated data files resident on a computer system, the data files being interrelated by one or more software tools resident on the computer system. According to the method of the present invention, a run-time dependency management facility is provided on the computer system which is effective to generate under computer control a graph indicating relationships among the data files and their software tools present on the system. A change is made to at least one of the data files and a determination is made as to whether that change is significant. If no significant change is made, then at least one propagation barrier is provided which is effective to prevent computer-implemented propagation of the change in said data file through at least one data file which is interrelated with the changed data file.

In one embodiment, the propagation barrier is an input barrier which is activated in response to a determination that no change has occurred since the last invocation of the tool. In another embodiment, the propagation barrier is an output barrier which is activated in response to a determination that any changes made to at least one of the output files of the tool.

In another aspect, the present invention provides a computer system for controlling the computer-implemented propagation of changes made to at least one data file throughout a system of interrelated data files resident on the computer system. In one embodiment, the computer system of the invention comprises a run-time dependency management facility which is effective to generate under computer control a graph indicating relationships among the data files and the software tools. The run-time dependency facility is combined with an evaluator for determining under computer control that the change to the data in the data file is not a significant change. Finally, these elements are combined with a propagation barrier activator for activating at least one propagation barrier in response to a determination by the evaluator that the change is not significant.

In still another aspect, the present invention includes a computer readable medium containing program instructions for providing a run-time dependency management facility on a computer system in which the run-time dependency facility is effective to generate under computer control a graph indicating relationships among the data files and the software tools residing on the system. The computer readable medium further includes program instructions for determining under computer control that the change to the data in at least one of the data files is not a significant change. Finally the computer readable medium includes program instructions for activating at least one propagation barrier in response to the determination which is effective to prevent propagation of the changes in the data file through at least one data file which is interrelated with the changed data file. In one embodiment, the above-described computer readable medium includes program instructions for a clever tool which can determine whether changes made to the changed data file are significant.

These and other aspects and advantages of the present invention will become apparent when the Detailed Description below is read in conjunctions with the accompanying Figures and Appendix.

DESCRIPTION OF SPECIFIC EMBODIMENTS

Figure 1:
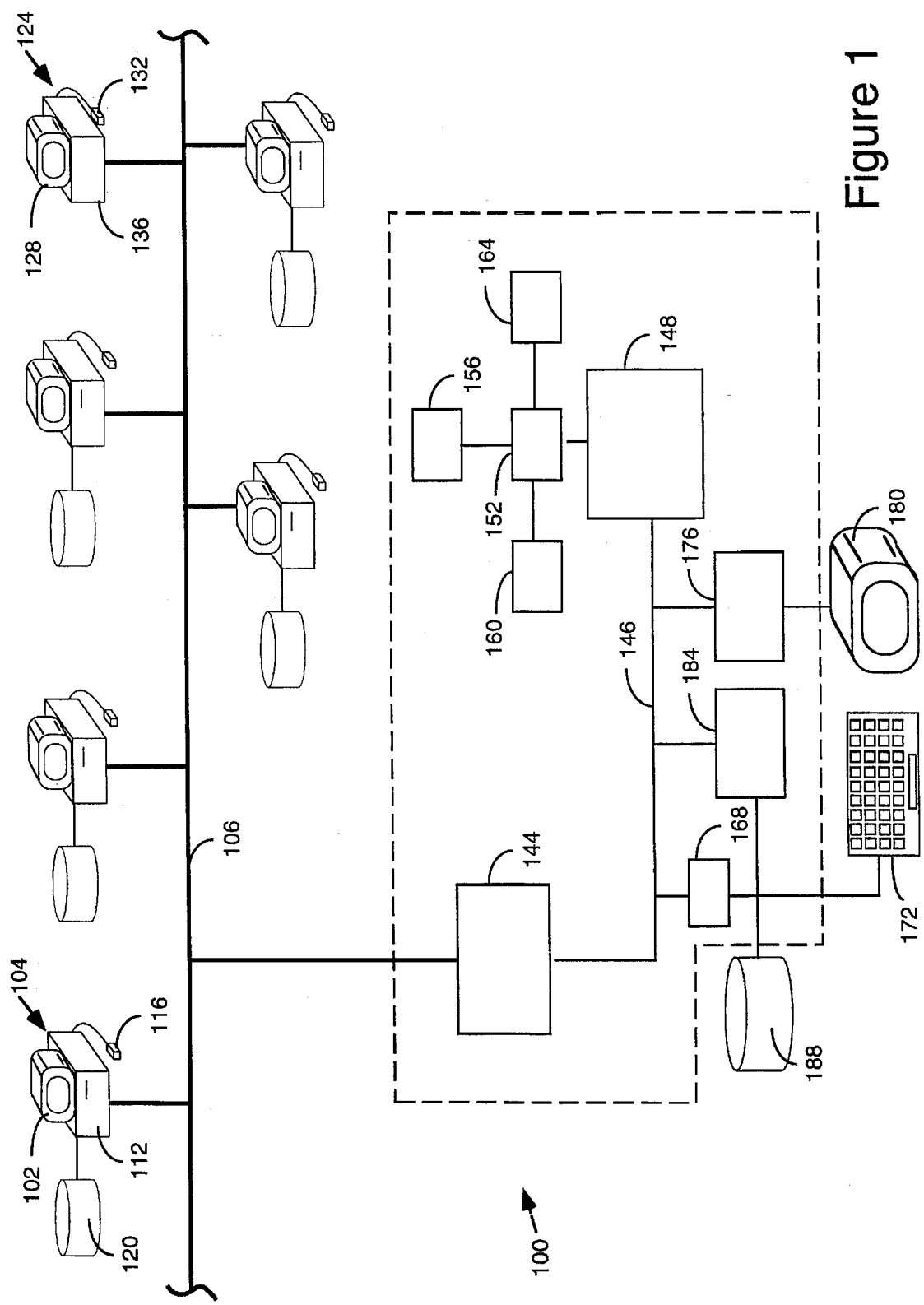
FIG. 1 is an illustration of several computers coupled to a network.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media which include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

FIG. 1 is an illustration of a computer network 100 which can be used in accordance with one embodiment of the present invention. As shown in the figure, the network includes workstations 104 which workstations include a monitor 108, a processing unit 112, typically one or more input devices such as mouse 116 and data storage means 120. The workstations and their components are formed from components well known to those of skill in the art of computer-aided design and computer-aided engineering and will vary according to the particular tasks that are being performed. Thus, input means 116 will also be taken to include devices such as keyboards, trackpads, trackballs, keypads, tablets, joy sticks, and the like. Similarly, data storage means 120 can include any type of means for storing data known to those of skill in the art including, but not limited to, hard disks, tape drives, CD-ROM disks, floptical drives, and magnetic floppy disks.

The workstations 104 are coupled to a network backbone such as shown to 106 to which backbone may further be coupled a server such as shown at 124. As with the workstations described above, the server can include a monitor 128, a data input means such as mouse 132, and a processing unit 136. Also as described above, the server can be of any design and configuration known to those of skill in the art of computer networks and especially those of skill in the art of adapting computer networks to workgroups.

A typical workstation is shown in greater detail at 140 in FIG. 1. There, the processing unit 112 is seen to comprise a network interface device 144 which is coupled with an input/output controller 148 along a bus 146. The input/output controller is further coupled to a memory cache 152 which memory cache is coupled to central processing unit 156. Read only memory (ROM) 160 and random access memory (RAM) 164 are also coupled to memory cache 152. In addition, keyboard controller 168 is coupled to keyboard 172 and is further coupled to bus 146. Video controller 176 is coupled to monitor 180 in addition to bus 146, as is drive controller 184 which is coupled to data storage means 188. The foregoing components, their design, and their arrangement, will be familiar to those of skill in the computing arts. In addition, it will be appreciated by those of skill in the computing arts that the foregoing descriptions are merely illustrative and that various other combinations and subcombinations of devices may be employed to provide workstations capable of functioning in accordance with the present invention.

Operating on one or more of the workstations described with respect to FIG. 1 above is software which comprises one or more tools, which tools are perform various operations on data contained in input files and produce the results of those operations in output files, which output files may also serve as inputs for other tools. Examples of such tools include, but are not limited to, compilers, file copying utilities, file renaming utilities, software for generating electronic or logic circuits, as well as software for generating two-dimensional and three-dimensional renderings of objects. The tools can be invoked either by the user directly or automatically (e.g., in a batch process). The invocation of the tools and their use of input files and production of output files defines interrelationships among the files stored on one or more of the data storage devices coupled to network 100. As used herein, the term "file" will be taken to include any unit of persistent data having a name and a timestamp and/or version number and which unit of persistent data is accessible to the tool.

Figure 2:
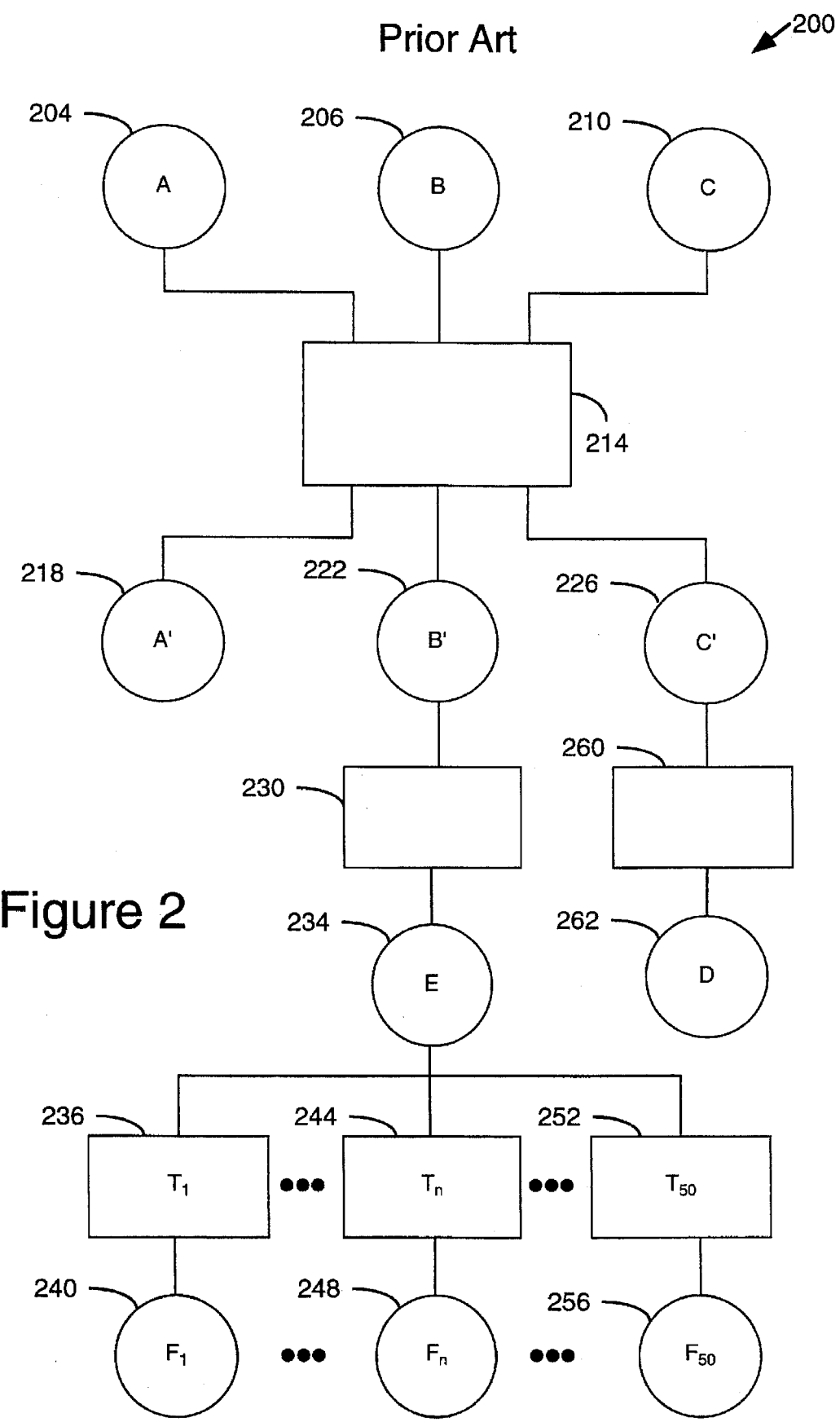
FIG. 2 is an illustration of a series of relationships between files and tools according to the Prior Art.

An illustration of such a family of interrelationships is provided in FIG. 2 at 200, which illustrates a series of relationships among files in a project according to the prior art. As shown at 200, three input files including input File A, 204, input File B, 206, and input File C 210, are interrelated with output File A' 218, output File B' 222, and output File C' 226 by a Tool 214. Output File A' 218 is connected to no other Tools. Output File B', however, is used by another Tool 230, such as a compiler, which Tool produces an output File E 234. Output File E is then used as input for various other Tools $T_t$ 236, ..., $T_n$ 244, ..., $T_{50}$ 252. These files produce output Files $F_t$ 240, ..., $F_n$ 2048, ..., $F_{50}$ 256. Output File C' is used as input by Tool 260 to produce a single output File D 262, which, like output A', has no additional interrelationships among the files shown. Those having skill in the art will appreciate that FIG. 2 is a simplified description; typically many more files will be used in a project.

As described above, in order to maintain consistency among the files that are interrelated by the various Tools illustrated in the FIG. 2, any change made to an input file, e.g., input file A 204, necessitates a complete reprocessing of the entire project in order to ensure that each file related to input file A has been updated to reflect the change in information content of input file A (i.e., each Tool must be invoked to reprocess each input file and thereby update each output file). Such effort may be necessary for some types of changes that are made to A, but wasteful for other type of changes. For example, where A is a file containing a schematic diagram for a digital circuit, and the structure of the circuit is altered, the change must be propagated to all files depending from A to maintain consistency. However, if a change is made only to a comment in the schematic (or some other cosmetic detail), propagation of the change would not likely be required to maintain consistency.

Figure 3:
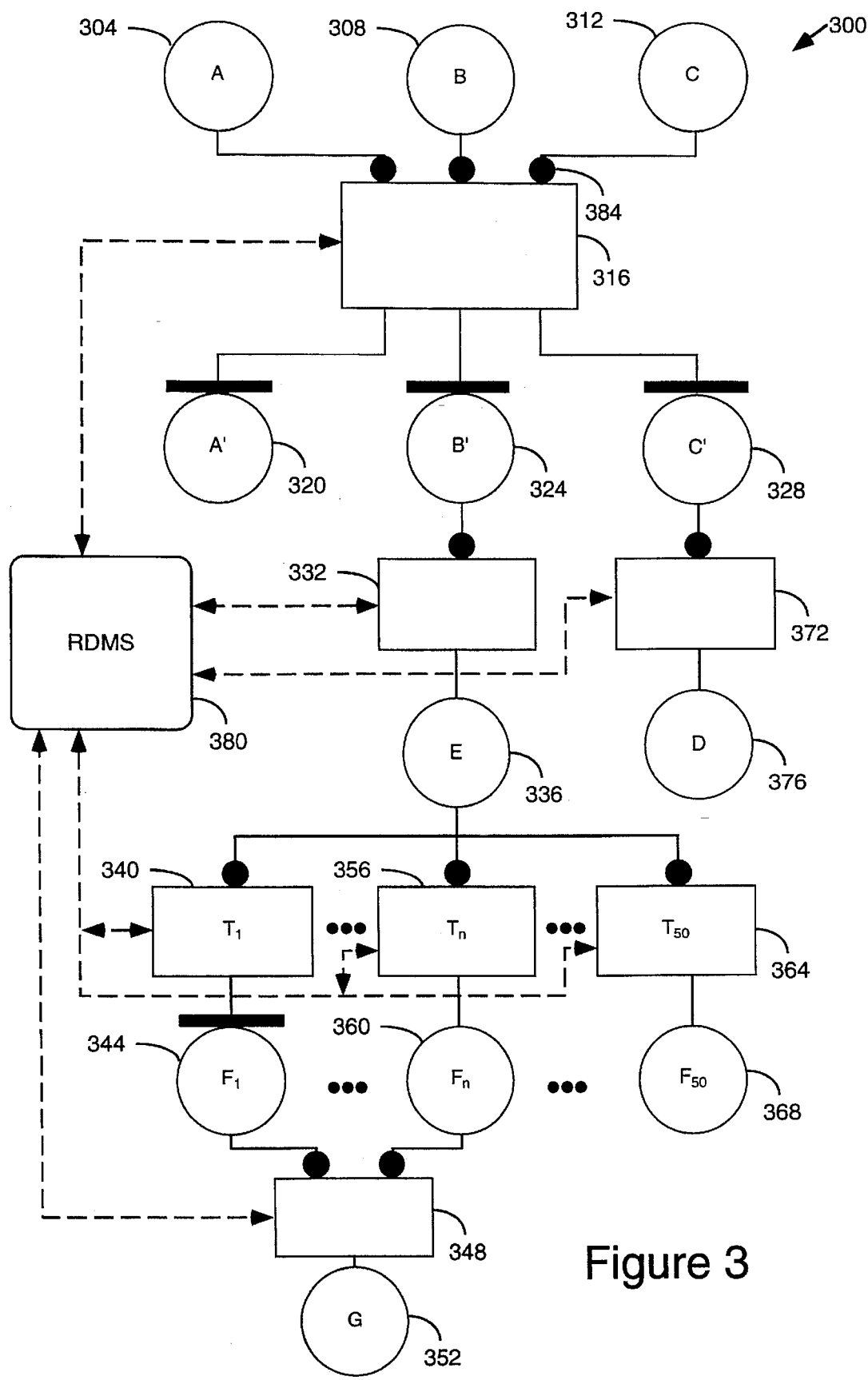
FIG. 3 is an illustration of relationships between a series of files and tools according to the method and apparatus of the present invention.

An intelligent approach to managing the propagation of changes in file content throughout the system of interrelated files such as shown in FIG. 2 is provided by the present invention and is illustrated in FIG. 3 at 300. There, input Files A 304, B 308, and C 312 serve as inputs for Tool 316 which produces output Files A' 320, B' 324, and C' 328. As described above with respect to FIG. 2, output File A' is not linked to any further files in the system, but output Files B' and C' are further processed to create relationships with additional files. With respect to output B' 324, that File is used as input for Tool 332 which Tool produces output File E 336. Output File E is used as input for Tool $T_t$ 340 to produce output File $F_t$ 344 which is used as input for Tool 348 to product output File G 352. Additionally, Tool $T_n$ 356 produces output File $F_n$ 360 which is also used by Tool 348 and, finally, Tool $T_{50}$ 364 produces output File $F_{50}$ 368. Output File C' 328 is used as input by Tool 372 to produce an output File D 376.

In one embodiment of the present invention, Tools 316, 332, 340, 348, 356, 364, and 372 are in communication with a ran-time dependency management system (RDMS) 380. One such run time dependency management systems is described by Casotto, A., and Sangiovanni-Vincentelli, A., 1993, Automated Design Management Using Traces, *IEEE Transactions on Computer-Aided Design of integrated Circuits and Systems*, 12(8):1077–1095, which is incorporated herein by reference. In one embodiment, the RDMS provides a graph illustrating the relationships among the files and tool invocations. This graph is produced in a completely transparent manner to the user. Each time the user invokes a tool, the tool communicates with the RDMS which logs the use of the tool, the input file(s) called by the tool, and the output file(s) produced by the tool. The communication between the RDMS and the tools is illustrated by the dashed lines in the Figure. The implementation of the RDMS can be achieved using methods known to those of skill in the computer programming arts.

In order to control the propagation of changes among the files in the project, the present invention provides propagation barriers that are effective to stop the flow of propagation so that only those files that require processing to maintain consistency with files whose data are changed are actually processed. Files that do not require updating are not processed. In one embodiment, the propagation barriers includes output barriers such as shown at 386 and input barriers such as shown in 384. These barriers indicate to the RDMS and the tools which files have not been changed significantly; thus providing a mechanism for the RDMS and the tools processing those files to determine whether execution is required to maintain consistency.

The determination of whether a change is significant will depend on the tool being invoked and is determined by the tool at run-time. Those having skill in the programming arts can determine the types of changes that are significant. As one example of a significant change which is described in greater detail below, a tool used to create an output file which is a duplicate of an input file will treat any change to the input file as significant. Thus, the tool will execute if any change to the input file has occurred. Alternatively, a tool used to strip comments from programming code will consider alterations to the comments as being significant; changes to the code itself are significant not.

In one embodiment, an output barrier is activated by the tool when the tool detects an existing output file and determines that processing of the input file(s) will not affect significantly the contents of at least one of the output file and communicates this evaluation to the RDMS. An input barrier is activated by the RDMS when a tool opening an input file that has not changed since the most recent previous successful execution of the tool notifies the RDMS that an input operation is being initiated. If the input barrier has been activated by the RDMS, the tool can determine whether and how to modify its behavior to limit any unnecessary processing.

Figure 4A:
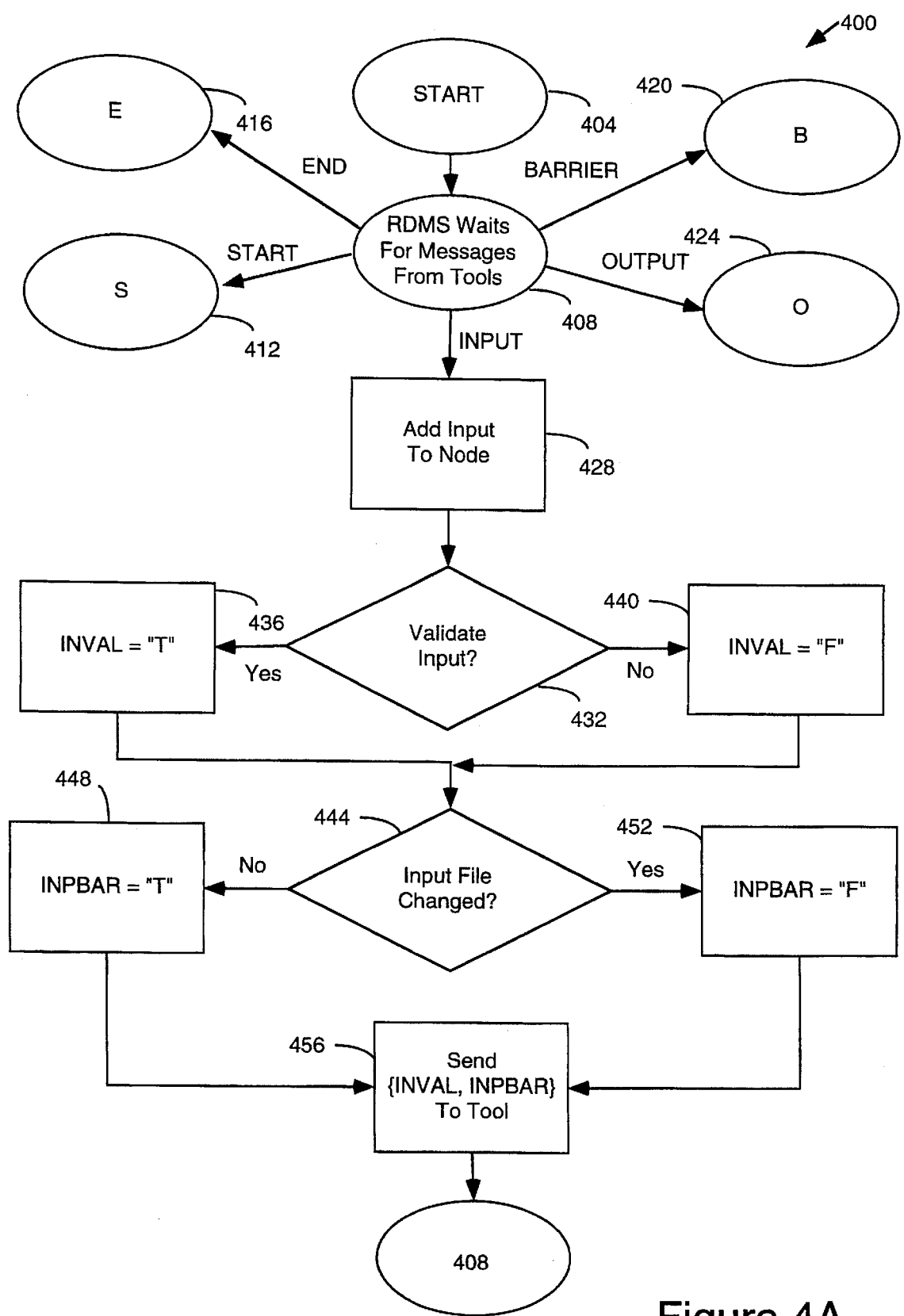
FIGS. 4A, 4B, 4C, 4D, and 4E are flowcharts illustrating the operation of a run-time dependency management system according to one embodiment of the present invention.
Figure 4B:
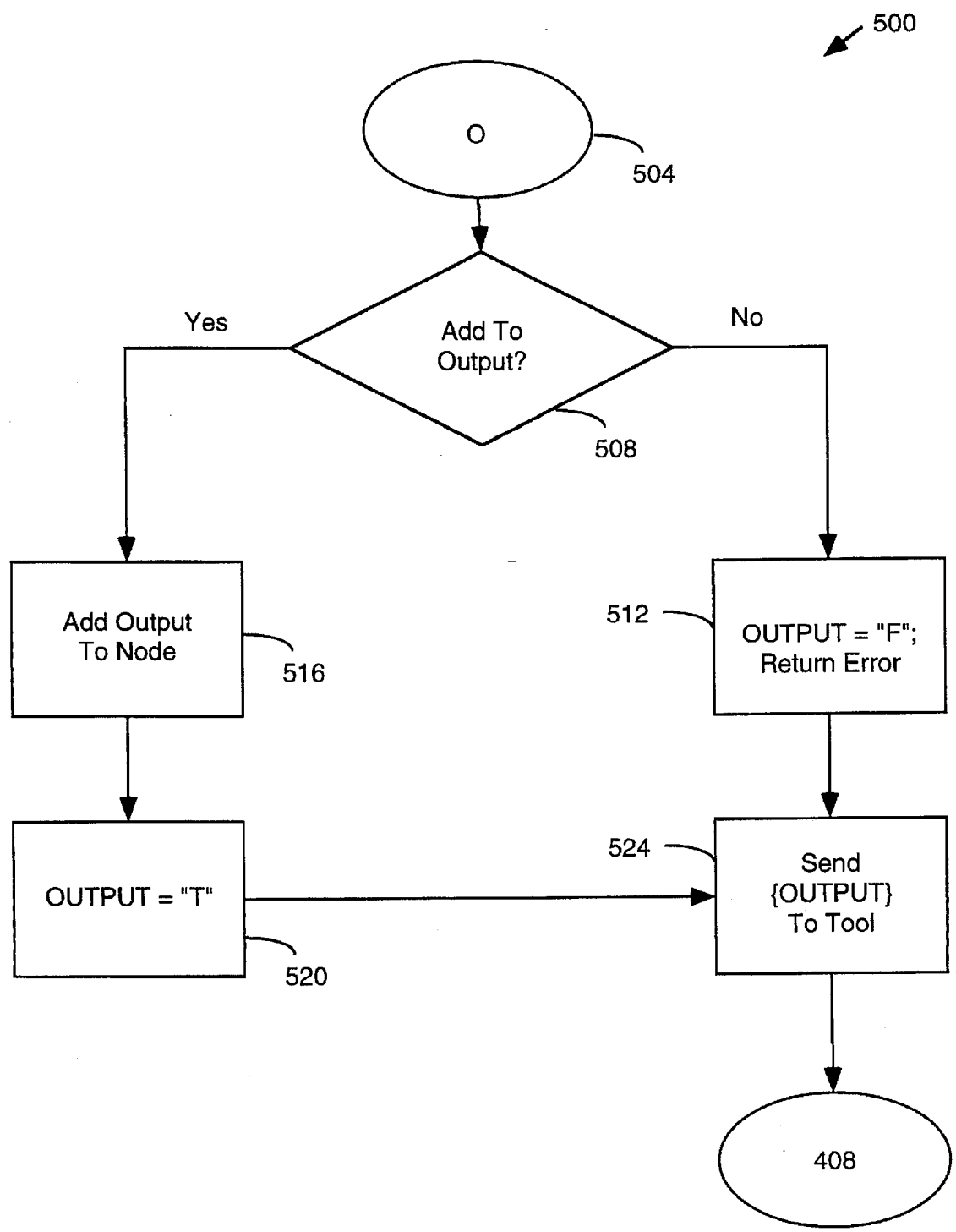

The operation of the run-time dependency management system is illustrated in FIGS. 4A–4E. According to one embodiment of the invention, as seen in FIG. 4A at 400, beginning at step 404 the RDMS waits for a message from a tool at step 408. In one embodiment, the RDMS can respond to five types of messages made by the tool. These messages include a START message, sent to the RDMS when the tool is invoked, that moves control of the system to step S 412; an END message, sent to the RDMS when the tool is about to finish execution, that moves control of the system to step E 416; an INPUT message which is described in greater detail in steps 428–460 in FIG. 4A; an OUTPUT message that moves control of the system to step O 424; and a BARRIER message that moves control of the system to step B 420. After the START message, and before the END message, various INPUT, OUTPUT, and BARRIER messages are sent by the tool to the RDMS during execution of the tool.

The INPUT message is sent to the RDMS when the tool is opening an input file and includes the name of the file being opened. According to one embodiment of the invention, upon receipt of an INPUT message from a tool, the RDMS adds the input to the tool node already existing in the graph of the data structure at step 428. Next, a determination is made whether the input is valid at step 432. If the input is valid (see below), then a variable INVAL is set to "true" at step 436. If the input is not valid, then the value of INVAL is set to "false" at step 440. In either case, control moves to the query at step 444 to determine whether the input file has changed and the most recent execution of the tool was successful. If the answer to query 444 is that the file has not changed and the most recent execution of the tool was successful, then the variable INPBAR is set to "true" at step 448 and the barrier is activated. Alternatively, if either the file has been changed, or the most recent execution of the tool was not successful, then the variable INPBAR is set to "false" at step 452 and the barrier is not activated. Finally, both variables INVAL and INPBAR are returned to the tool at step 456 at which point the tool determines whether to process the input file. The procedure returns to step 408.

The OUTPUT message is sent to the RDMS when the tool is opening an output file and includes the name of the file being opened. According to one embodiment of the invention, in response to an OUTPUT message from the tool, control of the process moves to step O 425 which step O is illustrated in greater detail at 500 in FIG. 4B. Beginning at step 504, a determination is made as to whether the file can be an output of the tool at step 508. If the answer to query 508 is negative, then the variable OUTPUT is set to false and an error is returned to be processed by the software at step 512. Error processing as used herein can include any means known to those of skill in the programming arts to handle situations when one or more variables indicate that certain conditions have not been met, including providing a user warning and/or writing a message to a log file. Alternatively, if the file is allowed to be an output of the tool at step 508, then an output node is added to the graph at step 516, and the variable OUTPUT is set to true at step 520. In either case of the determination of step 508, the variable OUTPUT is sent back to the tool at step 524 and the process returns to step 408.

Figure 4C:
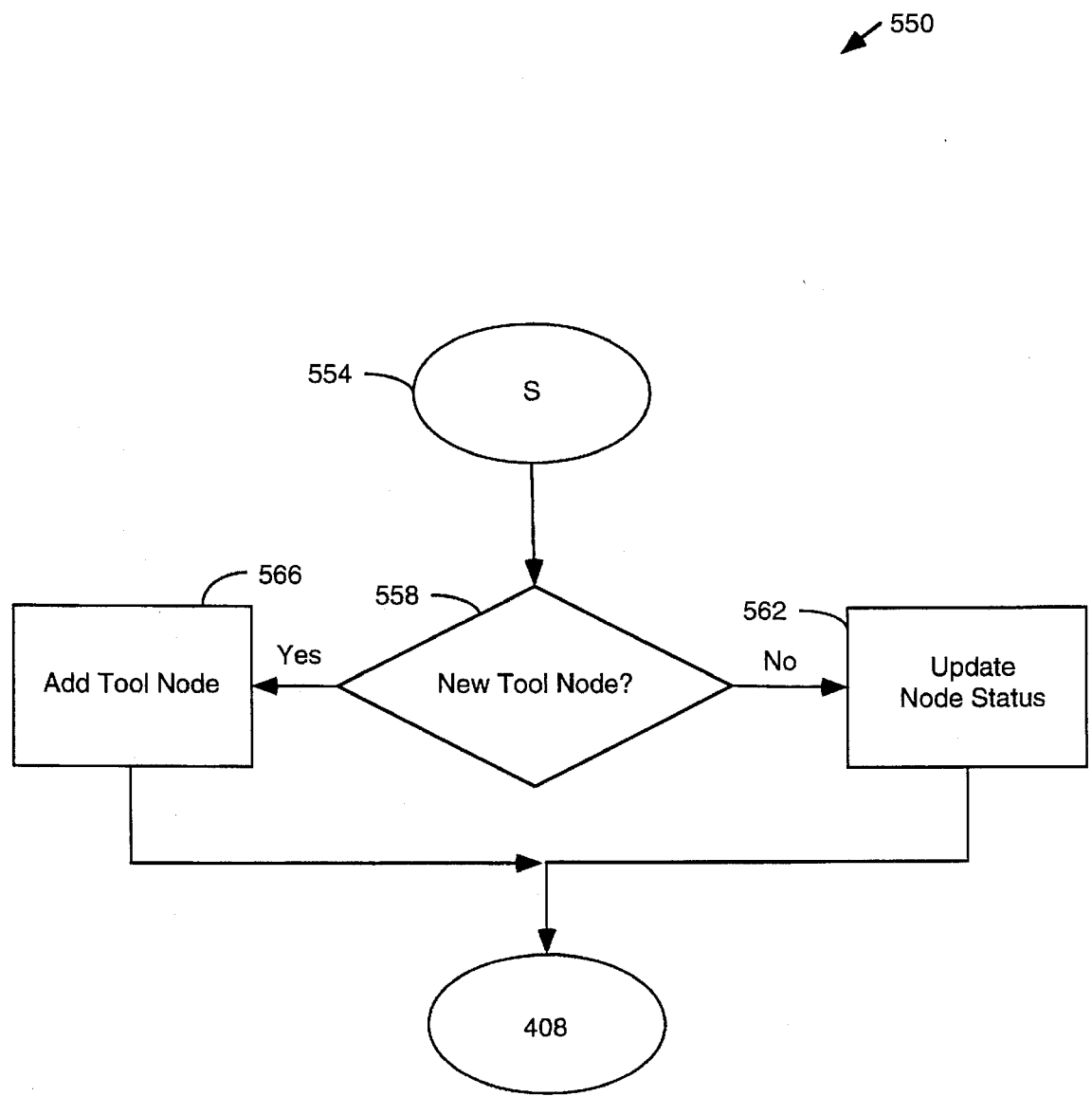

The START message is sent when the tool has just started execution, and includes identifying parameters for the tool. According to one embodiment of the invention, when a START message is sent to the RDMS, the sequence shown at 550 in FIG. 4C is executed. Beginning at step 554, a determination is made as to whether a new tool node is required for the graph at step 558. If no new tool node is required, e.g., because the tool has been executed at least once previously, then the node status is updated at step 562 and the process returns to step 408. Alternatively, a new tool node is added at step 566, and the process returns to step 408. In addition, if the tool has been executed previously, the RDMS determines whether the execution had been successful. This information will be used in processing the INPUT messages described above.

Figure 4D:
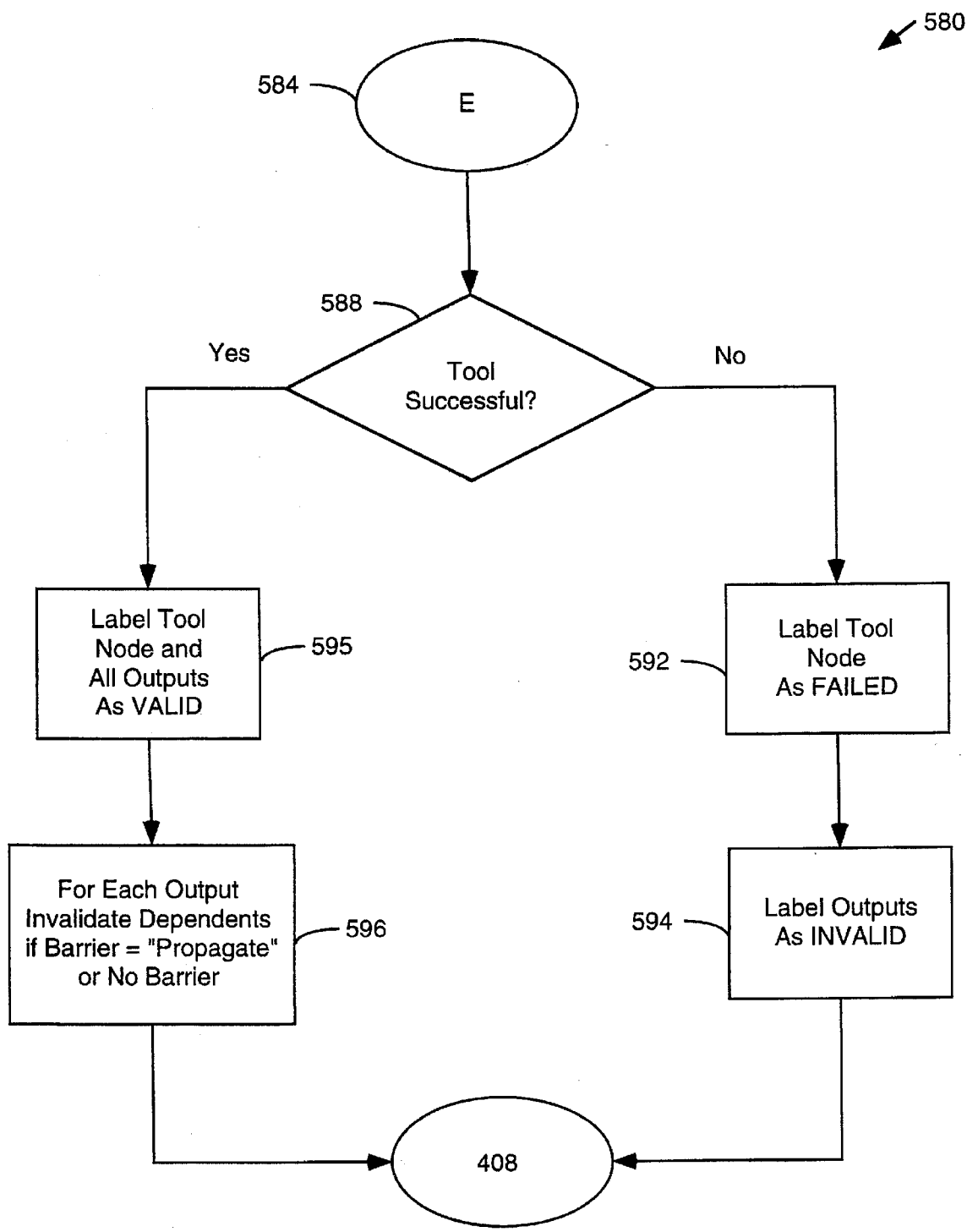
Figure 4E:
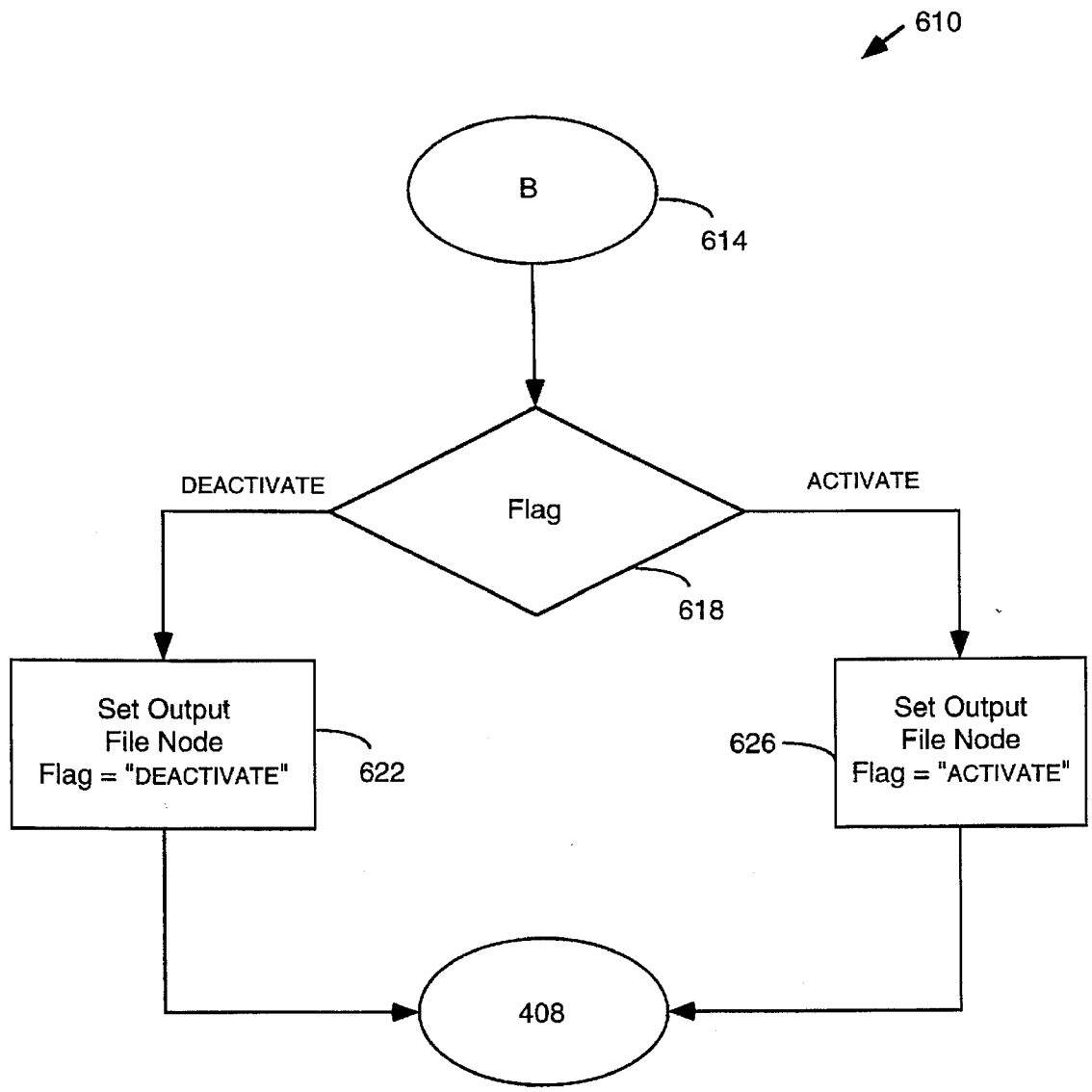

The END message is sent to the RDMS by the tool when the tool is about to finish execution, and includes an estimation by the tool as to the success of its execution. The processing of an END message by the RDMS according to one embodiment of the invention is illustrated in FIG. 4D at 580. There, beginning at step 584, a determination is made as to whether the tool actually executed successfully at step 588. If the execution of the tool was not successful, then at step 592 the tool node is labelled as "failed" and, at step 594, all of the output files are labelled as "invalid", i.e., all of the nodes depending from the invalid node are labelled "invalid" until a barrier is reached. The process then returns to step 408. Alternatively, if the tool has executed successfully at step 588, then, at step 595,the tool and its outputs are labelled as "valid", and, at step 596, for each output of the tool an invalidation of the filed depending from the output file is made if the barrier associated with the tool is set to "propagate" or no barrier is present. Control then moves to step 408.

The criteria to determine success of failure of a tool node includes, in one embodiment of the present invention, a consideration of the following factors: (1) whether the inputs remained valid for the whole duration of the tool; (2) whether the outputs have been modified since the tool was started; and (3) whether the tool terminated correctly. Changes made to an input file can be detected by the RDMS as the timestamp of the input file will increase upon completion and saving of the changes. If a change to an input file occurs, or if the input file becomes invalid for any other reason, then the RDMS labels the tool as invalid and all of the outputs of the tool must be recomputed in order to propagate the changes made to the input file.

A BARRIER message is sent from the tool to the RDMS when the tool is capable of determining that a significant change has been made to an output file. The message includes the name of the output file and a flag that can have a status of "deactivate" or "activate". The processing of a BARRIER message by the RDMS is illustrated at 610 in FIG. 4E. There, beginning at step 614, the status of the flag is checked at step 618. If the status of the flag is "DEACTIVATE", the flag is set to DEACTIVATE at step 622 and the sequence terminates at step 630. Alternatively, if the status of the flag is "ACTIVATE" the output file node for the flag is set to ACTIVATE at step 626 and the process returns to step 408. If the barrier is active, the output file is assumed not to be changed in a significant manner that would require propagation to its dependent files. If the barrier is deactivated, then the output file is assumed to have been changed so significantly that propagation of the change to the dependent files is required.

Figure 5:
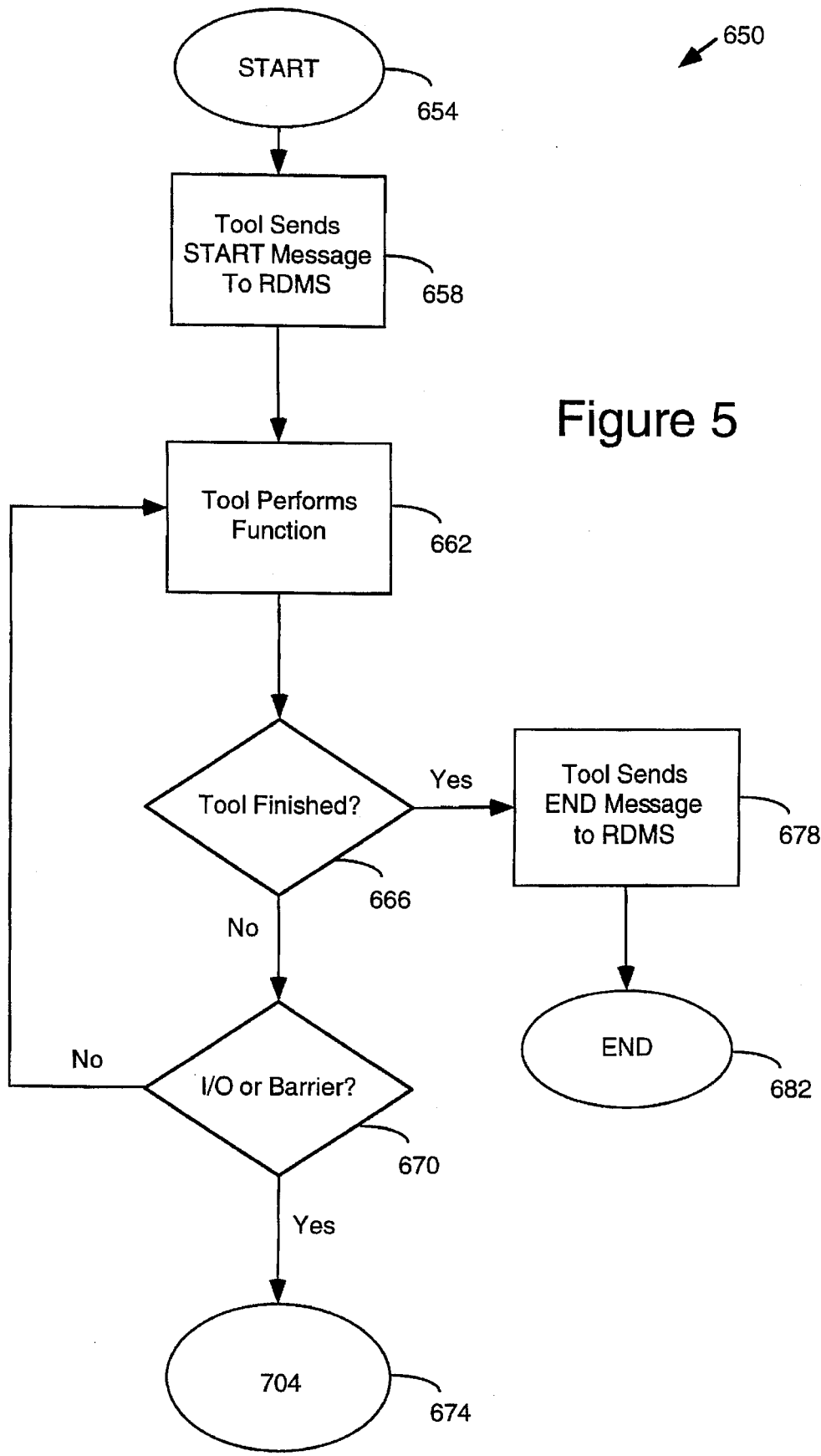
FIG. 5 and FIG. 6 are flow charts illustrating the operation of tools according to one embodiment of the present invention.
Figure 6:
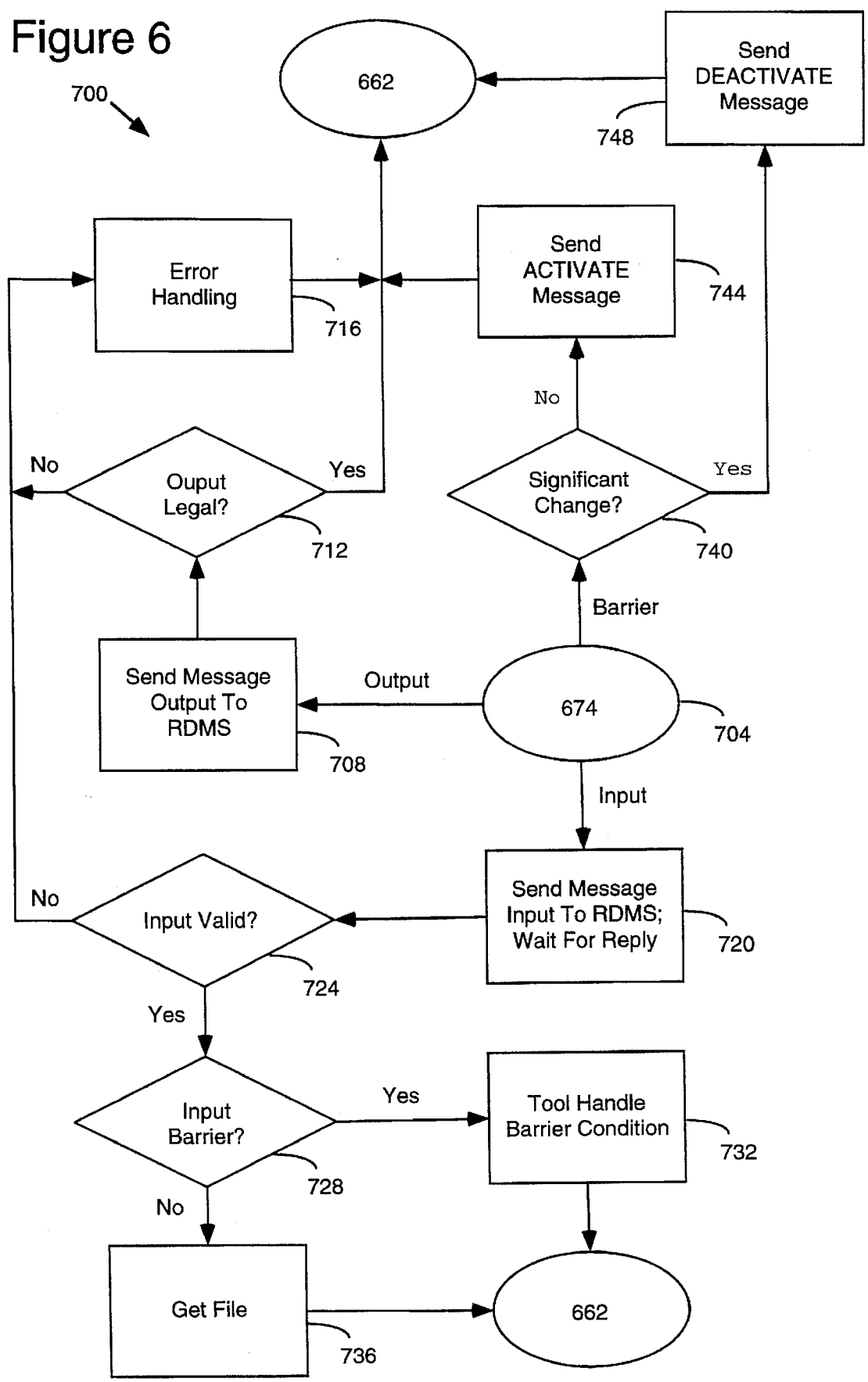

The operation of a tool that implements the ran-time propagation control features according to one embodiment of the invention is illustrated with respect to FIGS. 5 and 6. As seen in FIG. 5 at 650, beginning at step 654, a tool that is invoked sends a START message to the RDMS at step 658, the details of which message are explained in greater detail above. At step 662, the tool begins its normal function and, at step 666, a determination is made as to whether the tool is about to finish its execution. If the tool is not about to finish execution, a determination is then made as to whether an input/output (I/O) operation is about to be initiated, or a barrier has been detected by the tool at step

670. If the tool is about to finish execution, an END message as described above is sent to the RDMS at step 678 and the process terminates at step 682. If no I/O operation is being initiated, or no barrier is detected, at step 670, the program flow loops back to step 662. If, however, either an I/O operation or a barrier is detected, then flow moves to step 704 of FIG. 6.

The operation of one embodiment of the present invention with respect to input barriers is illustrated in FIG. 6 at 700. Beginning at step 704, if an output operation is to be executed by the tool, at step 708 the appropriate OUTPUT message is sent to the RDMS. Following the transmission of the OUTPUT message to the RDMS, a determination is made as to whether the output operation is legal, i.e., whether the tool is authorized to write to the output file, at step 712. A tool is not authorized to write to an output file if another tool at any time has written to that file, as such an operation would overwrite information in the system. If the output is not legal, then an error handling routine is initiated at step 716 indicating to the user that information may be lost in proceeding with output operation. The details of providing such error handling will be apparent to those of skill in the art. In the embodiment illustrated, the flow moves back to step 662 of FIG. 5 following the error handling. Alternatively, if the output operation is legal, then control returns to step 662 directly and the tool continues to perform its function.

If the operation at step 674 is an input operation, an INPUT message is sent to the RDMS and a reply is awaited at step 720. Upon receiving a reply from the RDMS, a determination is made at step 724 as to whether the input is valid. The details of determining validity are described above. If the input is not valid, then control returns to the error handling step 716. If the input is valid, then, at step 728, a determination is made as to whether an input barrier is present. If an input barrier is present, then the tool handles the barrier condition at step 732 and control returns to step 662 at which point the tool performs its function, i.e., the tool evaluates the situation and adjusts is operation accordingly. It will be appreciated that the response of the tool will depend on the tool's function and so will be determined largely by the developer of the tool. If no input barrier is present, then at step 736 the tool opens the input file and returns to its normal processing operation at step 662. The details of implementing the above-described evaluation will be apparent to those having skill in the art.

If a barrier is provided by the tool for a particular at step 674, then, at step 740, a determination is made as to whether a significant change has been made to the file. If the change is significant, then, at step 748, a DEACTIVATE message is sent to the RDMS and the barrier is "deactivated" so that change propagation can proceed. Control then returns to step 662. Alternatively, if the change is not significant, then an ACTIVATE message is sent to the RDMS and the barrier is "activated" so that propagation terminates at that node. As described above, what changes are significant will depend largely on the function of the tool and its implementation. Those having skill in the programming arts will be able to create tools that are capable of identifying which changes are significant using standard programming methods.

One example of such a tool, "Clevercopy" is provided in the Appendix. The function of Clevercopy is to make a copy of one or more input files. Upon detection of an input barrier on a file, Clevercopy bypasses the copy operation for that file as the barrier indicates that the contents of the file has not changed since the most recent successful execution of Clevercopy. However, it will be appreciated that in some cases the detection of an input barrier will only modify the function of a tool, but not prevent its operation altogether. In still other cases, the tool will ignore the input barrier. In the process of copying the input file, if the output file exists and is identical to the input file, Clevercopy activates the output barrier for the output file and the file is not changed. Otherwise, the output file is changed and the output barrier is deactivated.

The present invention further provides a method for making "clever tools", i.e., tools capable of taking advantage of the information provided by the above-described propagation barriers, and, in particular, the above-described input and output barriers. Clever tools are capable of determining whether the output of a tool has changed significantly. The result of that determination is then forwarded to the RDMS which activates a propagation barrier as described above. In one embodiment, a clever tool comprises the combination of a "dumb" tool (i.e., a tool not capable of clever functioning); an intermediate file which is the output of the "dumb" tool; and the above described Clevercopy tool. The "final output file" is the product of the clever tool and can be used for additional processing as appropriate. Thus, the final output file will be seen to correspond to the output files A', B', C', D, E, F, and G of FIG. 3 where the tools invoked in that Figure are clever tools. The intermediate files of the clever tools are not shown. Thus, when the "dumb" tool operates on an input file, the intermediate file produced is then used as input for Clevercopy which compares the intermediate file to the final output file. If there is no change, then a propagation barrier on the final output file is activated. In another embodiment, the Clevercopy tool can be replaced by a Cleverrename tool which deletes the above-described intermediate file after the copy operation is completed. This will be seen to reduce the storage requirements imposed by the use of Clevercopy.

The attached Appendix includes a library of functions for implementing one embodiment of the present invention which operates in conjunction with the Vov™ RDMS, available commercially from Runtime Design Automation of Alameda, Calif. The software can be run on such UNIX-based operating systems as Solaris I and Solaris 2 (available from Sun Microsystems of Mountain View, Calif.), Linux (available as freeware from many computer bulletin boards (BBSs) and the Internet) and HP-UX (available from Hewlett-Packard Corporation of Palo Alto, Calif.). The attached library is written in the C programming language and provides various calls that allow a tool to interact with the Vov™ RDMS. This library can be complied and implemented on any appropriate C compiler as will be apparent to those of skill in the computer programming arts. Furthermore, the integration of the function calls described in the Appendix with a tool can be performed using standard methods known to those having skill in the computer programming arts.

Thus, it will be seen that the present invention overcomes the severe drawbacks created by the need to reprocess input and output files without regard to whether such processing is required. Using the present invention, input barriers and output barriers can be provided so that only those files required to be processed are actually processed, thus reducing the costs regarding the use of processor time and human resource allocation.

Although the foregoing invention has been described in some detail for purposes of clarity of understanding, it will be apparent that certain changes and modifications may be practiced within the scope of the appended claims.

```
/*
 * Copyright (C) 1995 Runtime Design Automation.
 * Copyright (C) 1993 Siemens AG, Corporate R&D, Munich, Germany
 *
 * Author: Andrea Casotto          casotto@rtda.com
 *
 * This file is part of the VOV Integration Library.
 * This library is distributed in the hope that it will
 * be useful, but WITHOUT ANY WARRANTY; without even the
 * implied warranty of MERCHANTABILITY or FITNESS FOR
 * A PARTICULAR PURPOSE.
 */
#ifndef VIL_H
define VIL_H /*
 * THE 4 FUNDAMENTAL PROCEDURES:
 *    VovBegin( int argc, char*  argv[] );
 *       VovInput ( char* database, char* name );
 *       VovOutput( char* database, char* name );
 *    VovEnd( int status );
 */

/*
 * THE OTHER PROCEDURES YOU MAY NEED:
 *    VovFopen            ( char* filename, char* mode );
 *    VovResources        ( char* list );
 *    VovExecutable       ( char* executable );
 *    VovCorrectExitStatus( char* list );
 */

/*
 *   OTHER STUFF YOU WILL PROBABLY NEVER NEED:
 *   VovSetErrorHandler( void (*handler)(char* label, int status, char* msg ) );
 *   VovDebug( int flags );
 */
```

```
/*
 * Allow compilation on DOS machines.
 * As of yet <<Wed Jul  5 17:25:56 1995>> untested.
 */
#if defined(MSDOS) || defined(_WIN32)
#define VIL_STUBS_ONLY
endif ifdef VIL_STUBS_ONLY
/*
 * The library compiles only on UNIX.
 * For code that must compile on DOS and WIN,
 * we replace the library with just stubs.
 */
#define VovBegin(argc, argv)       ;
#define VovInput(d,n)              ;
#define VovOutput(d,n)             ;
#define VovExecutable(a)           ;
#define VovResources(s)            ;
#define VovCorrectExitStatus(s)    ;
#define VovFopen                   fopen
define VovEnd                     exit else
```

```
/*
 * The real header for UNIX platforms.
 */ include <stdio.h>   /* Required to get the definition of FILE. */ ifndef ARGS
define ARGS(s) (/* (s) */)
#endif

/*
 * Error codes and return status of all major
 * VIL procedures are defined as of type VovStatus
 * which is actually a small integer.
 */ typedef int     VovStatus;

define   VOV_LICENSE_VIOLATION         -9
#define   VOV_CANNOT_CONNECT_TO_SERVER  -8
#define   VOV_CHANNEL_DIED              -7
#define   VOV_OUTPUT_CONFLICT           -5
#define   VOV_INPUT_CONFLICT            -4
#define   VOV_CYCLE                     -3
#define   VOV_NOT_FOUND                 -2
#define   VOV_ERROR                     -1
#define   VOV_NOT_OK                     0
#define   VOV_OK                         1

/*
 * void VovBegin(int argc, char* argv);
 *
 * This procedure is called as soon as the tool has
 * decided that it is going to do something. Typically
 * the procedure is called after all command line options
 * have been interpreted.
 *
 * The procedure opens the pipes and forks the channel unless
 * it is executed by a process which is a child of another
 * process that has already opened pipes and started a channel,
 * in which case the child process inherits pipes and channel
 * from the parent.
 */ extern void  VovBegin ARGS( ( int argc, char* argv[] ) );

/*
 * VovStatus VovInput( char* db, char* name );
 *
 * If the procedure returns you may get:
 *      VOV_OK
```

```
*       VOV_INPUT_CONFLICT
*             The input is not valid.
*       VOV_CYCLE
*             The declaration causes a cycle
*             in the dependency graph
*/ extern VovStatus   VovInput ARGS( ( char* db, char* name ) );

/*
* VovStatus VovOutput( char* db, char* name );
*
* If the procedure returns here is what you may get:
*       VOV_OK
*       VOV_OUTPUT_CONFLICT
*             Then the application should try to change the
*             output name.
*       VOV_CYCLE
*             The declaration causes a cycle
*             in the dependency graph.
*/ extern VovStatus   VovOutput ARGS( ( char* db, char* name ) );

/*
* The procedure VovEnd( int status ) should be used instead of
* exit( status ) to signify correct behavior of the tool.
*
* The procedure flushes stdout and stderr, terminates the channel,
* closes the pipes and calls exit( status ).
*
* The procedure   void _VovEnd( int status );
* is like VovEnd() except that it does not call exit().
*/ extern void    VovEnd  ARGS( ( int status ) );
extern void   _VovEnd  ARGS( ( int status ) );

/*
*   OTHER EXPORTED PROCEDURES
*/

/*
* void  VovResources( char*  resourceList );
*
* Declare the resources required by the tool.
*
* resourceList is a space-separated list of the resources
* required by the tool.
*/ extern void   VovResources ARGS( (char* resource ) );

/*
* VovStatus VovExecutable( char* programName );
```

```
*
* This procedure is equivalent to
*
* VovInput( "UNIX", fullPathForProgram );
*
* The full path for the executable is computed by the
* channel.
*/
extern VovStatus   VovExecutable ARGS( (char* programName) );

/*
* FILE* VovFopen( char* fileName, char* mode )
*
* This utility function is a good replacement for
* most instances of fopen().
*
* Input conflicts, output conflicts, cycle conflicts
* are managed by the channel.
*
* There are cases in which a file opened with mode "r"
* is actually an output for the transition. In those cases,
* this procedure may not be usable.
*/ extern FILE* VovFopen    ARGS((char* name,char* mode));

/*
* By default, only exit status 0 (zero) is considered good for a correct
* termination of the program. If your program uses other codes
* to signiufy correct behavior, use this procedure to describe these codes.
*
*  list is a space separated list of numbers to be interpreted as
*  valid exit status.  Ranges of values can be expressed as N-M
*  Examples:     "0"              -- This is the default.
*                "0 2 3"          --
*                "2-4 10 100-120" -- A very bizarre tool!
*                "0-255"          -- Any exit status is good.
*/ extern void   VovCorrectExitStatus ARGS( ( char* list ) );

/*
* One debug mask is supplied for the integration library.
* This mask is passed to the channel. This allows the
* monitoring of the communication traffic between through
* the channel.
*
* This flag causes verbose output and should be
* set to 0 under normal conditions.
*/ define    VOV_DEBUG_CHANNEL_MASK        0x01
define    VOV_DEBUG_COMM_CLIENT_MASK    0x02
#define    VOV_DEBUG_COMM_SERVER_MASK    0x04
#define    VOV_DEBUG_C_LIBRARY_MASK      0x08
#define    VOV_DEBUG_RPC_CODES           0x10
```

```
#define   VOV_DEBUG_COMMUNICATION_MASK    ( \
                                          VOV_DEBUG_COMM_CLIENT_MASK  \
                                         |VOV_DEBUG_COMM_SERVER_MASK  \
                                         )

#define   VOV_DEBUG_ALL_MASK              ( \
                                          VOV_DEBUG_CHANNEL_MASK       \
                                         |VOV_DEBUG_COMM_CLIENT_MASK   \
                                         |VOV_DEBUG_COMM_SERVER_MASK   \
                                         |VOV_DEBUG_C_LIBRARY_MASK     \
                                         |VOV_DEBUG_RPC_CODES          \
                                         )

extern void VovDebug ARGS((int flags ));

/*
 * The user can intercept all errors by calling the procedure:
 *
 * VovSetErrorHandler( handler  );
 *
 * handler is a pointer to a user-provided error handler,
 * which should have the following interface:
 *
 *      void handler( char* label, int status, char* msg );
 *
 * where:
 *     label:  is the string "VIL";
 *     status: is one of the error codes;
 *     msg:    is an explanatory message.
 */ extern void VovSetErrorHandler ARGS(( void (*handler)() ));

endif   /* ifdef VIL_STUBS_ONLY */ endif   /* ifdef VIL_H */
```

```
/*
** Copyright (C) 1995 Runtime Design Automation
** Copyright (C) 1993 Siemens AG,
**     written by Andrea Casotto (casotto@rtda.com)
**
** This file is part of the VOV Integration Library.
**
** This library is distributed in the hope that it will
** be useful, but WITHOUT ANY WARRANTY; without even the
** implied warranty of MERCHANTABILITY or FITNESS FOR
** A PARTICULAR PURPOSE.
*/

/*
**    This is the VOV Integration Library (VIL)
**
**    File:    vil.c
**    Date:    September 1993, June 1995
**    Author:  Andrea Casotto
*/

/*
**    Naming conventions for this file:
**    vilFunctionName()     -- Functions used internally by the VOV integration
**                             library and possibly available for extensions to
**                             the library.
**    VovFunctionName()     -- Functions exported to the application.
**    VovVariableName       -- Variables exported to the application.
**    otherNames            -- Local variables and functions.
**    UPPER_CASE_NAMES      -- Macros and constants.
*/

/*
** The library supports a single transaction per tool.
** If an integrated tool calls another integrated tool, the
** I/O behavior of the child tool becomes part of the I/O
** behavior of the parent.
*/

/*
** The source code of the integration library is
** distributed to all tool developers, so that they
** can verify that the library does not affect the
** behavior of their tool.
**
** The developers are free to use the library as it
** is or to improve it according to their own
** programming guidelines  (as long as it works ...).
*/

/*
** The integration library is completely passive.
** All functions return immediately and with no
** effect if the conditions to connect to the VOV
```

```
** server are not satisfied.
*/ include <malloc.h>         /* For malloc(). */
include <stdlib.h>         /* For getenv(). */
#include <sys/wait.h>       /* For wait3(). */
include <signal.h>         /* To trap death of channel. */ include "vil.h"

/* Forward declarations. */
extern void vilSendString ARGS( ( char* s ) );
extern void vilSendInt    ARGS( ( int   n ) );
extern int  vilActive     ARGS( ( int startFlag ) );
```

```
/****************************************************************/
/****************************************************************/
/*  --------   Debugging    ------------------------------------*/
/****************************************************************/
/****************************************************************/
/*
** One debug mask is supplied for the integration library.
** This mask is passed to the channel. This allows the
** monitoring of the communication traffic between through
** the channel.
**
** This flag causes verbose output and should be
** set to 0 under normal conditions.
*/

/* This is exported. */
int VovDebugFlags = 0;

#define DEBUG_LIB   (VovDebugFlags & VOV_DEBUG_C_LIBRARY_MASK)

void VovDebug( flags   )
    int flags;
{
    VovDebugFlags = flags;

if ( vilActive(0) ) {
        vilSendString( "DEBUG" );
        vilSendInt    ( flags );
    }
}
```

```
/****************************************************************/
/****************************************************************/
/* ----------   Exception Handling   -------------------------*/
/****************************************************************/
/****************************************************************/
/*
** All errors detected by the library cause the
** control to pass to an error handler.
** By default, the handler prints an error message
** on stderr and exits.
*/

/*
 *   Global error handler. Can be set by the user.
 */
static void (*errHandlerPtr)() = 0;

/*
 * The user can intercept all errors by calling the procedure:
 *
 * VovSetErrorHandler( handler );
 *
 * handler is a pointer to a user-provided error handler,
 * which should have the following interface:
 *
 *      void handler( char* label, int status, char* msg );
 *
 * where:
 *     label:  is the string "VIL";
 *     status: is one of the error codes;
 *     msg:    is an explanatory message.
 */ void VovSetErrorHandler( handler )
    void (*handler)();
{
    errHandlerPtr = handler;
} static char* describeStatus( status )
    VovStatus status;
{
    switch ( status ) {
    case VOV_ERROR:
        return "Generic error";
    case VOV_INPUT_CONFLICT:
        return "Input conflict";
    case VOV_OUTPUT_CONFLICT:
        return "Output conflict";
    case VOV_CYCLE:
        return "Cycle detected in dependency graph";
    case VOV_NOT_FOUND:
```

```
            return "File not found";
    case VOV_NOT_OK:
            return "Unexpected \"NO\" answer from a procedure";
    case VOV_CHANNEL_DIED:
            return "Channel died";
    case VOV_CANNOT_CONNECT_TO_SERVER:
            return "Cannot connect to server";
    case VOV_LICENSE_VIOLATION:
            return "License violation";
    default:
            return "Unknown status";
    }
} void vilError( name, code, string )
    char*           name;
    int             code;
    char*           string;
{
    if ( errHandlerPtr ) {
        (*errHandlerPtr)( name, code, string );
    } else {
        /*
         *    Default handler: print message and exit.
         */
        fprintf( stderr, "Error detected by %s.\n  Code %d=%s\n\t%s\n",
                name, code, describeStatus( code ), string );
        exit( code );
    }
}
```

```
/****************************************************************/
/****************************************************************/
/* ----------- Global variables for this file.   ------------*/
/****************************************************************/
/****************************************************************/ static int   channelStartedByMe = 0;      /* Set if channel forked by this proce
static int   sendDescriptor;              /* File descriptor used to send messag
                                             to channel. */
static int   receiveDescriptor;           /* File descriptor used to receive
                                             messages from channel. */
static FILE* receiveFp;
static int   channelPid         = 0;      /* PID of the channel. */
static int   redirectStdFlag    = 1;      /* Redirect stdout and stderr. */
```

```
/*****************************************************************/
/*****************************************************************/
/* -------- Utility functions                 ------------------*/
/*****************************************************************/
/*****************************************************************/ char* vilStrsav( s )
    char* s;
    /*
     *   Make a copy of a string.
     *   When will this function become standard in UNIX?
     */
{
    char* newString = (char*)malloc( (size_t)strlen(s)+1 );
    (void)strcpy( newString, s );
    return newString;
} static void vilSetenv( name, value )
    char* name;
    char* value;
    /*
     *   Set an environment variable.
     *
     *   Return nothing, just do it.
     */
{
    int    nameLen  = strlen( name );
    int    valueLen = strlen( value );
    char*  newValue = (char*)malloc( (size_t)(nameLen+valueLen+2) );

sprintf( newValue, "%s=%s", name, value );

/*
    ** I do not like putenv() because it makes it difficult to
    ** recover memory space. Here newValue cannot be freed.
    */
    if ( putenv( newValue ) != 0 ) {
        vilError( "VIL", VOV_ERROR, "Cannot set an environment variable" );
    }
} static char* vilChannelPath()
    /*
     * Find the full path of the vov_channel binary.
     */
{
    return getenv( "VOV_CHANNEL" );
}
```

```c
/****************************************************************/
/****************************************************************/

/****************************************************************/
/****************************************************************/ static int vilCheckStartConditions()
    /*
     * Check that there are enough data to establish connection to
     * the VOV server and to fork the VOV channel.
     * RETURN: 1 all is OK
     *         0 otherwise.
     */
{
    /* 315-vov%StartConditions <<START>>
    ** The following conditions must be satisfied in order for the
    ** library to become active:
    **
    ** The variable VOV_HOST_NAME     must be set.
    **
    ** The variable VOV_PROJECT_NAME must be set.
    **
    ** The variable VOV_CHANNEL       must be set.
    **
    **
      315-vov%StartConditions <<END>> */ if ( getenv( "VOV_HOST_NAME" )     == (char*)0 ) return 0;
    if ( getenv( "VOV_PROJECT_NAME" )  == (char*)0 ) return 0;
    if ( vilChannelPath()              == (char*)0 ) return 0;

/* 499-vov%Debug-Environment-Variable <<START>>
        ** The environment variable VOV\_DEBUG\_FLAGS can be set
        ** to control the debug flags in the VOV library.
        **
        ** Since this variable should be used only by experts,
        ** no particular effort is made here to make it easy
        ** to use.
        **
        ** This variable has an integer value. The values are
        ** those determined by the debugging constants defined in
        ** (->419) and declared in vil.h.
        **
          499-vov%Debug-Environment-Variable <<END>> */ if ( getenv( "VOV_DEBUG_FLAGS" )  != (char*)0 ) {
        VovDebugFlags = atoi( getenv( "VOV_DEBUG_FLAGS" ) );
    } return 1;
}
```

```
static void declareChannelOpen( receiveDescriptor, sendDescriptor )
    int receiveDescriptor;
    int sendDescriptor;
    /*
     * Set the environment variable VOV_CHANNEL_OPEN.
     * If the current process forks another process which also tries
     * to connect to VOV, that process will check this environment
     * variable and use the same channel.
     */
{
    char buf[64];

sprintf( buf, "%d", receiveDescriptor * 1000 + sendDescriptor );
    vilSetenv( "VOV_CHANNEL_OPEN", buf );
} static int channelStartedByParentProcess()
    /*
     * Check if the channel is already open. If so, use it.
     */
{
    if ( ! channelStartedByMe ) { char* fdString = getenv( "VOV_CHANNEL_OPEN" );

if ( fdString != (char*)0 ) {
            /*
             * Use channel that is already open:
             * get encoded value of channel descriptors.
             */ int codedFileDescriptors = atoi( fdString );

receiveDescriptor = codedFileDescriptors / 1000;
            sendDescriptor    = codedFileDescriptors % 1000;

if ( DEBUG_LIB ) {
                fprintf( stderr, "Channel already open by parent %s\n", fdString
            } return 1;
        }
    }
    return 0;
}
```

```
static int vilOpenPipeAndStartChannel()

/* 339-vov%Channel <<START>>
    ** When activated, the library forks a new process
    ** called the "VOV CHANNEL". The library and the channel
    ** communicate over UNIX pipes (->427).
    ** All communication is based on NULL-terminated ASCII strings.
    **
    ** The channel communicates with the VOV server. The graphical
    ** user interface is provided by the channel.
    **
    ** Note: This architecture allows the integration
    ** library to be small.
    **
    ** By default, stderr and stdout are piped through the channel.
    ** The user can avoid this by calling VovRedirect() (->291).
    ** ** 339-vov%Channel <<END>> */

/*
     * This procedure returns  0 if pipes and channel cannot be started,  1 othe
     */
{
    int     pipes[4][2];
    int     p;                      /* Index for pipes. */

/* Make sure that the channel is available and running. */
    if ( ! vilCheckStartConditions() ) {
        return 0;
    }

/*
    ** Four UNIX pipes are are used between the library and
    ** the channel:
    **
    **                  --> Stdout          -->
    ** LIBRARY          --> Stderr          -->     CHANNEL
    **                  --> Send pipe       -->
    **                  <-- Receive pipe    <--
    **
    */ for ( p = 0 ; p < 4 ; p++ ) {
        if ( pipe( pipes[p] ) == -1 ) {
            vilError( "VIL", VOV_ERROR, "Pipe failed." );
        }
    } sendDescriptor    = pipes[2][1];
    receiveDescriptor = pipes[3][0];

receiveFp = fdopen( receiveDescriptor, "r" );
    if ( receiveFp == 0 ) {
        vilError( "VIL", VOV_ERROR, "Cannot fdopen on receive pipe." );
    } channelPid = fork();
    if ( channelPid == -1 ) {
        vilError( "VIL", VOV_ERROR, "Fork failed." );
```

```
    } if ( channelPid == 0 ) {
      extern char** environ;                  /* The environment. */
      /*
       ** This is the child process.
       */
      char* argv[8];
      int   i = 0;                            /* Index in argv. */ close( pipes[0][1] );
      close( pipes[1][1] );
      close( pipes[2][1] );
      close( pipes[3][0] );
      pipes[3][0] = pipes[3][1];      /* To simplify the following loop. */ argv[i++] = vilChannelPath();
      for ( p = 0 ; p < 4 ; p++ ) {
          char buf[32];
          sprintf( buf, "%d", pipes[p][0] );
          argv[i++] = vilStrsav( buf );
      }
      argv[i++] = ( VovDebugFlags & VOV_DEBUG_CHANNEL_MASK ) ? "1" : "0";
      argv[i++] = 0 ;                /* Terminate arg list. */ if ( execve( argv[0], argv, environ ) == -1 ) {
          vilError( "VIL", VOV_ERROR, "Failed execve.");
      }
      /* This point cannot be reached. */
    } channelStartedByMe = 1;

close( pipes[0][0] );
    close( pipes[1][0] );
    close( pipes[2][0] );
    close( pipes[3][1] );

/*
     * Redirect stdout and stderr through the channel.
     * dup2()   is   a UNIX  system call.
     */
    if ( redirectStdFlag ) {
        if ( dup2( pipes[0][1], fileno( stdout )) == -1 ) {
            vilError( "VIL", VOV_ERROR , "Cannot redirect stdout." );
        }
        if ( dup2( pipes[1][1], fileno( stderr )) == -1 ) {
            vilError( "VIL", VOV_ERROR , "Cannot redirect stderr." );
        }
    } declareChannelOpen( receiveDescriptor, sendDescriptor );
    return 1;
}
```

```
static void vilSendCurrentVersion()
{
    vilSendString( "VERSION" );
    vilSendString( "4.5"     );
} static void vilClosePipes()
{
    if ( DEBUG_LIB ) fprintf( stderr, "Closing pipes\n" );
    close( receiveDescriptor );
    close( sendDescriptor );
} int vilActive( startFlag )
    int startFlag;
{
    static int active = -1;

if ( active == -1 ) {
        if ( startFlag ) {
            active = vilOpenPipeAndStartChannel();
        } else {
            active = 0;        /* VovBegin() was not called first. */
        }
    }
    return active;
}
```

```c
/******************************************************************/
/******************************************************************/
/* ------   Send and Receive routines     ----------------   */
/******************************************************************/
/******************************************************************/ void vilSendString( s )
    char* s;
    /*
     * Send the null terminated string to the channel.
     */
{
    int  length = strlen( s );

/* write() is a UNIX system call. */ if ( write( sendDescriptor, s, length + 1 ) == -1 ) {
        vilError( "VIL", VOV_ERROR, "Write string failed." );
    } if ( DEBUG_LIB ) fprintf( stderr, "VILSend:(%d)%s \n", length+1, s );
} void vilSendInt( n )
    int n;
{
    char buf[32];
    sprintf( buf, "%d", n );
    vilSendString( buf );
} void vilSendDouble( n )
    double n;
{
    char buf[32];
    sprintf( buf, "%g", n );
    vilSendString( buf );
}

/*
 * NORMAL args for signal would be:
 *    int sig; int code; struct sigcontext *scp;
 *
 * But this is not portable in general. It is best to avoid args
 * altogether here.
 * (Feel free to change this to suit your system.)
 */ define SIGNAL_FN void static SIGNAL_FN trapChildHandler(   /* All args are ignored */   )
{
    int         pid = waitpid( 0, 0, 0 );
```

```
        if ( pid == channelPid ) {
            vilError( "VIL", VOV_CHANNEL_DIED, "Channel died." );
        } else {
            fprintf(stderr, "Strange child died" );
        }
    } char* vilReceiveString()
    /*
     * Returns a null terminated string that has arrived from the channel.
     * The string is valid until the next call to this function.
     *
     * No return in case of error.
     */
{
    static size_t size = 0;
    static char*  buf  = 0;

int       count = 0;
    int       c;
    SIGNAL_FN (*oldhandler)();                           /* Returned from get
                                                         /* Signal handler. */ oldhandler = signal( SIGCHLD, trapChildHandler );    /* Trap possible deat if ( buf == 0 ) {                                    /* Allocate buf */
        size = 128;
        buf  = (char*)malloc( size );
    } while ( ( c = getc( receiveFp ) ) != '\0' ) {
        if ( c == EOF ) {
            vilError( "VIL", VOV_CHANNEL_DIED, "Receiving data from channel" );
        }
        buf[count++] = c;

if ( count >= size ) {
            buf  = (char*)realloc( (void*)buf, size * 2 );
            size *= 2;
        }

}
    buf[count] = '\0';                      /* Terminate string. */
    signal( SIGCHLD, oldhandler );          /* Restore old signal handler. */ if ( DEBUG_LIB ) fprintf( stderr, "\t\t\t\t\tVILRead:(%d)%s\n",
                              count+1, buf );

return  buf;
} int vilReceiveInt()
{
    char* s = vilReceiveString();
    int   n = atoi( s );
    return n;
```

```
/*****************************************************************/
/*****************************************************************/
/* ----------      Main  Exported  Procedure    ---------------- */
/*****************************************************************/
/*****************************************************************/ void VovRedirect( flag_arg )
    int flag_arg;

/* 291-vov%VovRedirect <<START>>
        ** void VovRedirect( int flag );
        **
        ** By default, stderr and stdout are piped through
        ** the channel (->427).
        ** The user can avoid this by calling  VovRedirect( 0 ).
        **
        ** Must be called before VovBegin().
        **
        **
        ** ** 291-vov%VovRedirect <<END>> */
{
    redirectStdFlag = flag_arg;
}
```

```
void VovBegin( argc, argv )
    int    argc;
    char** argv;

/* 259-vov%VovBegin <<START>>
     ** void VovBegin(int argc, char** argv);
     **
     ** This procedure is called as soon as the tool has
     ** decided that it is going to do something. Typically
     ** the procedure is called after all command line options
     ** have been interpreted.
     **
     **
     ** The procedure opens the pipes and forks the channel unless
     ** it is executed by a process which is a child of another
     ** process that has already opened pipes and started a channel,
     ** in which case the child process inherits pipes and channel
     ** from the parent.
     **
     **
     ** ** 259-vov%VovBegin <<END>> */

{
    if ( channelStartedByParentProcess() ) {
        return ;
    }
    if ( vilActive(1) )   {
        int i;
        vilSendCurrentVersion();

vilSendString( "BEGIN" );
        vilSendInt( argc );
        for ( i = 0 ; i < argc; i++ ) {
            vilSendString( argv[i] );
        }
        if ( vilReceiveInt() == 0 ) {
            vilError("VIL", VOV_CANNOT_CONNECT_TO_SERVER,
                    "In VovBegin" );
        }
    }

/*
    ** Let the server get the proper debugging info.
    */
    /* VovDebug( VovDebugFlags ); */
}
```

```
        /* 411-vov%Type-Of-Places <<START>>
         ** Places are distinguished only by the database
         ** in which they are stored and by the different
         ** methods used to edit, copy, and delete them.
         **
         ** The VOV integration library uses ASCII strings
         ** to indicate the type of a place. This should
         ** allow the library to be valid even as new types
         ** of places are added.
         **
         **
           411-vov%Type-Of-Places <<END>> */ static VovStatus vilIo( key, db, name )
    char*       key;
    char*       db;
    char*       name;
    /*
     ** Utility routine used by VovInput, VovOutput and VovExecutable.
     */
{
    if ( DEBUG_LIB ) {
        fprintf( stderr, " --- DEBUG VOV LIB --- %10s '%15s' %s\n",
            key, db, name );
    }
    if ( ! vilActive(0) ) return VOV_OK;

vilSendString( key  );
    vilSendString( db   );
    vilSendString( name );

return vilReceiveInt();
}

VovStatus VovInput( db  , name )
    char*       db  ;
    char*       name;

/* 275-vov%VovInput <<START>>
         ** VovStatus VovInput( char* db  , char* placeName );
         **
         ** If the procedure returns you may get:
         **     VOV_OK
         **     VOV_INPUT_CONFLICT
         **         The input is not valid.
         **     VOV_CYCLE
         **         The declaration causes a cycle
         **         in the dependency graph
         **     VOV_ILLEGAL_PLACE_TYPE
         **         db   is not recognized
         ** ** 275-vov%VovInput <<END>> */
{
    return vilIo( "INPUT", db  , name );
}

VovStatus VovOutput( db  , name )
```

```
        char*       db   ;
        char*       name;

/* 283-vov%VovOutput <<START>>
             ** VovStatus VovOutput( char* db   , char* placeName );
             **
             ** If the procedure returns here is what you may get:
             **     VOV_OK
             **     VOV_OUTPUT_CONFLICT
             **         Then the application should try to change the
             **         output name.
             **     VOV_CYCLE
             **         The declaration causes a cycle
             **         in the dependency graph.
             **     VOV_ILLEGAL_PLACE_TYPE
             **         db   is not recognized
             ** ** 283-vov%VovOutput <<END>> */
{
        return vilIo( "OUTPUT", db   , name );
}
```

```
/* Define a handy macro for error handling in VovFopen() */
#define VOV_LIB_ASSERT( expr, label )    { \
       VovStatus s;s=(expr);if(s!=VOV_OK)vilError("VIL",s,label);}

FILE* VovFopen( file, mode )
    char* file;
    char* mode;

/*
     * FILE* VovFopen( char* fileName, char* mode )
     *
     * This function is a good replacement for
     * most instances of fopen(), BUT NOT ALL OF THEM!!
     *
     * Input conflicts, output conflicts, cycle conflicts
     * are managed by the channel.
     *
     * There are cases in which a file opened with mode "r"
     * is actually an output for the transition. In those cases,
     * this procedure may not be usable.
     */
{
    FILE*    fp;

/* Check only the first letter of mode. The others are not important. */
    if ( mode[0] == 'w' ) {
        VOV_LIB_ASSERT( VovOutput( "UNIX", file ), "VovFopen() mode w" );
    } fp = fopen( file, mode );

if ( mode[0] == 'r' && fp != 0 ) {
        VOV_LIB_ASSERT(VovInput( "UNIX", file ), "VovFopen() mode r" );
    }

/*
    ** In append mode, we assume the file is both an input and an output.
    */ if ( mode[0] == 'a' ) {
        if ( fp != 0 ) {
            VOV_LIB_ASSERT(VovInput( "UNIX", file ),
                          "in VovFopen() mode a" );
        }
        VOV_LIB_ASSERT( VovOutput( "UNIX", file ),
                       "in VovFopen() mode a" );
    }
    return fp;
}

VovStatus VovExecutable( programName )
    char *programName;
```

```
    /*
    ** VovStatus VovExecutable( char* programName );
    **
    **
    ** This procedure is equivalent to
    **
    ** VovInput( "UNIX",  fullPathForProgram );
    **
    ** The full path for the executable is computed by the
    ** channel.
    */
{
    return vilIo( "EXECUTABLE", "UNIX", programName );
} void   VovResources( resourceList )
    char* resourceList;

/*
    ** char*  VovResources( char*  resourceList );
    **
    **
    ** Declare the resources required by the tool.
    **
    ** resourceList is a space-separated list of the resources
    ** required by the tool.
    **
    ** The tool can be executed only by a slave that provides all
    ** the resources.  The followin standard resources are expanded
    ** by the channel:
    ** @DISPLAY@ @USER@ @HOST@ @VOVARCH@ @OS@ @OS.VERSION@ @STD@
    **
    */
{
    if ( vilActive(0) ) {
        vilSendString( "RESOURCE" );
        vilSendString( resourceList );
    }
}
```

```
void  VovCorrectExitStatus( list )
    char* list;
/*
 * list is a space separated list of numbers to be interpreted as
 * valid exit status.  Ranges of values can be expressed as N-M
 * Examples:    "0"             -- This is the default
 *              "0 2 3"         --
 *              "2-4 10 100-120" --
 */
{
    if ( vilActive(0) ) {
        vilSendString( "CORRECT EXIT STATUS" );
        vilSendString( list );
    }
} void  _VovEnd( status )
    int status;

/* See below comment for VovEnd(). */

{
    if ( vilActive(0) )  {
        vilSendString( "END" );
        vilSendInt    ( status );
        vilClosePipes();
    }
} void  VovEnd( status )
    int status;

/*
     * VovEnd( int status ) should be used instead of
     * exit( status ) to signify correct termination of the tool.
     *
     * The procedure flushes stdout and stderr, terminates the channel,
     * closes the pipes and calls exit( status ).
     *
     * The procedure    void _VovEnd( int status );
     * is like VovEnd() except that it does not call exit().
     *
     * By convention, correct termination is represented by a status==0.
     * Any other value will be considered a failure code, unless
     * VovCorrectExitStatus() is called.
     */
{
    int         w;                 /* Value returned by wait3(). */ if ( vilActive( 0 ) ) {
        if ( channelStartedByMe ) {
            fflush( stdout );
            fflush( stderr );
            _VovEnd( status );
            do {
                w = waitpid( 0, 0, 0 );
            } while ( w != channelPid );
            exit( status );
        } else {
```

```
            _exit( status );          /* This leaves all descriptors open. */
        }
    }
    exit( status );
}

/* End of file vov.c */
/* End of file vov.c */
/* End of file vov.c */
/* End of file vov.c */
```

What is claimed:

1. A method for controlling the computer-implemented propagation of changes made to at least one data file throughout a system of interrelated data files resident on a computer system, said data files being interrelated by one or more software tools resident on said computer system, the method comprising the steps of:
   a) providing a run-time dependency management facility on said computer system, said run-time dependency management facility being effective to generate under computer control a graph indicating relationships among said data files and said software tools;
   b) changing data in at least one of said data files under computer control;
   c) determining under computer control that said change to said data in said data file is not a significant change in response to said changing; and
   d) activating under computer control at least one propagation barrier in response to said determination, said propagation barrier being effective to prevent computer-implemented propagation of said change in said data file through at least one data file which is interrelated with said data file.

2. The method of claim 1, wherein said propagation barrier is an input barrier which is activated in response to a determination that no significant change occurred since the last invocation of said tool.

3. The method of claim 2, wherein said step of activating said input barrier is performed by said run-time dependency management facility.

4. The method of claim 3, wherein said step of activating comprises sending a message from said run-time dependency management facility to said tools indicating that said input barrier is active.

5. The method of claim 4, wherein at least one of said tools activates an output barrier in response to said message from said run-time dependency management system.

6. The method of claim 2, wherein said propagation barrier is an output barrier which is activated in response to a determination that changes made to at least one of the output files of said tool is not a significant change.

7. The method of claim 6, wherein said step of determining that said change is not a significant change is performed by said tool.

8. The method of claim 7, wherein said tool notifies said run-time dependency facility that said change is not a significant change.

9. The method of claim 1, wherein said software tools are clever tools.

10. A computer system for controlling the computer-implemented propagation of changes made to at least one data file throughout a system of interrelated data files resident on a computer system, said data files being interrelated by one or more software tools resident on said computer system, said system comprising:
    a) a run-time dependency management facility, said run-time dependency management facility being effective to generate under computer control a graph indicating relationships among said data files and said software tools;
    b) an evaluator for determining under computer control that said change to said data in said data file is not a significant change, said evaluator being configured to be activated by a change in one of said data files; and
    c) a propagation barrier activator for activating under computer control at least one propagation barrier in response to a determination by said evaluator that said change is not significant, wherein said propagation barrier is effective to prevent computer-implemented propagation of said change in said data file through at least one data file which is interdependent with said changed data file.

11. The computer system of claim 10, wherein said propagation barrier activator activates an input barrier in response to a determination by said evaluator that no significant change has occurred to said changed file since the last invocation of said tool.

12. The computer system of claim 11, wherein said propagation barrier activator activates an output barrier in response to a determination by said evaluator that said change is not a significant change.

13. The computer system of claim 10, wherein said tool is a clever tool.

14. A computer readable medium containing program instructions for:
    a) providing a run-time dependency management facility on a computer system, said run-time dependency management facility being effective to generate under computer control a graph indicating relationships among interrelated data files and software tools resident on the computer system;
    b) determining under computer control that said change to data in at least one of said data files is not a significant change, in response to said changing; and
    c) activating under computer control at least one propagation barrier in response to said determination, said propagation barrier being effective to prevent computer-implemented propagation of said change in said data file through at least one data file which is interrelated with said changed data file.

15. The computer readable medium of claim 14, further including program instructions for activating an input barrier in response to a determination that said changed file is an input file for at least one of said tools and that no significant change occurred since the last invocation of said tool.

16. The computer readable medium of claim 15, further including program instructions for activating an output barrier in response to a determination that said changed file is an output file of at least one of said tools and that said change is not a significant change.

17. The computer readable medium of claim 14, further including program instructions for a clever tool.

18. The computer readable medium of claim 17, wherein said program instructions for said clever tool include instructions for determining whether changes to said changed data file are significant.

19. The computer readable medium of claim 18, wherein said program instructions for said clever tool include program instructions for indicating to said run-time dependency facility that said changes to said changed file are not significant.

* * * * *